(12) United States Patent
Sun et al.

(10) Patent No.: US 10,925,011 B2
(45) Date of Patent: Feb. 16, 2021

(54) METHOD FOR COMMUNICATION BETWEEN USER EQUIPMENTS, USER EQUIPMENT, AND BASE STATION

(71) Applicant: Huawei Technologies Co., Ltd., Shenzhen (CN)

(72) Inventors: Yanliang Sun, Shenzhen (CN); Nathan Edward Tenny, San Diego, CA (US); Yongbo Zeng, Beijing (CN); Yu Cai, Beijing (CN); Bin Liu, San Diego, CA (US); Da Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 114 days.

(21) Appl. No.: 16/326,064

(22) PCT Filed: Aug. 16, 2016

(86) PCT No.: PCT/CN2016/095459
§ 371 (c)(1),
(2) Date: Feb. 15, 2019

(87) PCT Pub. No.: WO2018/032325
PCT Pub. Date: Feb. 22, 2018

(65) Prior Publication Data
US 2019/0191396 A1   Jun. 20, 2019

(51) Int. Cl.
*H04W 52/46* (2009.01)
*H04W 48/12* (2009.01)
(Continued)

(52) U.S. Cl.
CPC .............. *H04W 52/46* (2013.01); *H04B 7/26* (2013.01); *H04B 17/309* (2015.01);
(Continued)

(58) Field of Classification Search
None
See application file for complete search history.

(56) References Cited

U.S. PATENT DOCUMENTS

2014/0071957 A1   3/2014   Xu et al.
2014/0328329 A1   11/2014   Novlan et al.
(Continued)

FOREIGN PATENT DOCUMENTS

CN   104798428 A   7/2015
CN   105191178 A   12/2015
(Continued)

OTHER PUBLICATIONS

"Initial Views on 5G Technologies—from Terminal Perspectives," 3GPP RAN Workshop on 5G Phoenix, AZ, USA, RWS-150069, Shenzhen Coolpad Technologies, Sep. 17-18, 2015, 15 pages.

*Primary Examiner* — Mohammed Rachedine
(74) *Attorney, Agent, or Firm* — Slater Matsil, LLP

(57) ABSTRACT

A method for communication between user equipments, user equipment, and a base station. The method includes establishing, by a first user equipment (UE), a first virtual cell, and sending, by the first UE, a first synchronization signal and a first broadcast message, wherein the first synchronization signal comprises an identity of the first virtual cell, and wherein the first broadcast message comprises configuration information of the first virtual cell, wherein the first synchronization signal and the first broadcast message cause a second UE to access the first virtual cell according to the identity of the first virtual cell and the configuration information of the first virtual cell, and to communicate with the first UE.

20 Claims, 7 Drawing Sheets

(51) Int. Cl.
*H04W 56/00* (2009.01)
*H04W 76/11* (2018.01)
*H04W 52/14* (2009.01)
*H04W 52/36* (2009.01)
*H04W 74/08* (2009.01)
*H04B 7/26* (2006.01)
*H04B 17/309* (2015.01)
*H04W 8/00* (2009.01)
*H04W 92/18* (2009.01)
*H04W 72/04* (2009.01)

(52) U.S. Cl.
CPC ......... *H04W 48/12* (2013.01); *H04W 52/146* (2013.01); *H04W 52/365* (2013.01); *H04W 56/00* (2013.01); *H04W 72/04* (2013.01); *H04W 74/0833* (2013.01); *H04W 76/11* (2018.02); *H04W 92/18* (2013.01); *H04W 8/005* (2013.01); *Y02D 30/70* (2020.08)

(56) References Cited

U.S. PATENT DOCUMENTS

| | | |
|---|---|---|
| 2017/0127281 A1 | 5/2017 | Zhang et al. |
| 2017/0171786 A1* | 6/2017 | Mochizuki ...... H04W 36/00835 |
| 2017/0195163 A1* | 7/2017 | Chae ..................... H04L 5/0094 |
| 2017/0295603 A1* | 10/2017 | Chae ................. H04W 72/0406 |
| 2018/0192410 A1* | 7/2018 | Liu ................... H04W 72/0406 |
| 2018/0270801 A1 | 9/2018 | Novlan et al. |

FOREIGN PATENT DOCUMENTS

| | | |
|---|---|---|
| EP | 2981143 A1 | 2/2016 |
| EP | 3461211 A1 | 3/2019 |
| WO | 2015142086 A1 | 9/2015 |
| WO | 2016023324 A1 | 2/2016 |

* cited by examiner

METHOD FOR COMMUNICATION BETWEEN USER EQUIPMENTS, USER EQUIPMENT, AND BASE STATION

CROSS-REFERENCE TO RELATED APPLICATIONS

This application is a national stage of International Application No. PCT/CN2016/095459, filed on Aug. 16, 2016, which is hereby incorporated by reference in its entirety.

TECHNICAL FIELD

Embodiments of the present invention relate to communications technologies, and in particular, to a method for communication between user equipments, user equipment, and a base station.

BACKGROUND

The Internet of Things has become a hot topic of research on mobile communications technologies. Low-performance user equipment (UE), similar to watches, earphones, other virtual reality devices and intelligent sensing devices, and the like, is an important branch of the Internet of Things. A performance counter of the low-performance user equipment is usually lower than a performance counter of high-performance user equipment such as mobile phones and tablet computers. If all low-performance user equipments access a telecommunications network, further shortage of spectrum resources is inevitably caused.

In the prior art, to implement communication between the low-performance user equipment and the high-performance user equipment, a device to device (D2D) technology in a Long Term Evolution (LTE) system may be used. In other words, a D2D connection is established between the high-performance user equipment and the low-performance user equipment.

However, the D2D technology is essentially designed for two user equipments that have equivalent communication capabilities. Therefore, the establishment of the D2D connection between the high-performance user equipment and the low-performance user equipment results in relatively large power consumption of the low-performance user equipment.

SUMMARY

Embodiments of the present invention provide a method for communication between user equipments, user equipment, and a base station, to reduce power consumption of low-performance user equipment.

According to a first aspect, an embodiment of the present invention provides a method for communication between user equipments, including establishing, by first user equipment UE, a virtual cell, and sending, by the first UE, a first synchronization signal and a first broadcast message, where the first synchronization signal includes an identity of the virtual cell, and the first broadcast message includes configuration information of the virtual cell, so that based on the identity of the virtual cell and the configuration information of the virtual cell, second UE accesses the virtual cell and communicates with the first UE.

The first UE establishes the virtual cell, so that the second UE accesses the virtual cell, to implement communication between the first UE and the second UE. In the communication method, the first UE and the second UE do not need to have equivalent communication capabilities. Therefore, for the low-performance second UE, this communication manner can reduce power consumption of the second UE.

Optionally, the establishing, by first user equipment UE, a virtual cell includes sending, by the first UE, a virtual cell establishment request message to a base station, where the virtual cell establishment request message is used to trigger the base station to schedule a first resource, and the first resource is used by the first UE to establish a random access channel, a data channel, and a control channel of the virtual cell, and generate a reference signal corresponding to the data channel and a reference signal corresponding to the control channel, and obtaining, by the first UE, the first resource, and by using the first resource, establishing the random access channel, the data channel, and the control channel of the virtual cell, and generating the reference signal corresponding to the data channel and the reference signal corresponding to the control channel.

The first UE can effectively establish the virtual cell in this manner.

Optionally, the method further includes receiving, by the first UE, first maximum transmit power sent by the base station, where the first maximum transmit power is maximum transmit power that is indicated by the base station and that can be used when the first UE sends data on the first resource or when the second UE accesses the virtual cell.

Optionally, before the sending, by the first UE, a first synchronization signal and a first broadcast message, the method further includes obtaining, by the first UE, an identity and signal quality of a virtual cell established by third UE, and sending, by the first UE, the identity and the signal quality of the virtual cell established by the third UE to the base station, so that the base station schedules a second resource for the first UE based on the identity and the signal quality of the virtual cell established by the third UE, where the second resource is used by the first UE to send the first synchronization signal and the first broadcast message, where a first resource pool in which the first resource is located and a second resource pool in which the second resource is located do no intersect in time domain and/or in frequency domain, and the third UE is UE that has established a virtual cell by using a third resource in the second resource pool.

The first resource pool in which the first resource scheduled for the first UE to establish the virtual cell is located and the second resource pool in which the second resource used to send the first synchronization signal and the first broadcast message is located do no intersect, in other words, are mutually separated. In this way, the first UE only needs to monitor, in the second resource pool, the third UE that has sent a synchronization signal and a broadcast message, instead of performing monitoring in both the first resource pool and the second resource pool, thereby improving monitoring efficiency. The first UE establishes the virtual cell based on a monitoring result, thereby improving efficiency of establishing the virtual cell.

Optionally, before the obtaining, by the first UE, an identity and signal quality of a virtual cell established by third UE, the method further includes receiving, by the first UE, a second broadcast message sent by the base station, where the second broadcast message is used to broadcast time domain information and frequency domain information of the second resource pool, and determining, by the first UE, the second resource pool based on the time domain information and the frequency domain information, and determining the third UE.

The third UE can be effectively determined by using the second broadcast message sent by the base station.

Optionally, the obtaining, by the first UE, an identity and signal quality of a virtual cell established by third UE includes receiving, by the first UE, a second synchronization signal sent by the third UE, and determining, by the first UE based on the second synchronization signal, the identity and the signal quality of the virtual cell established by the third UE.

Optionally, the first resource pool is an unlicensed spectrum resource, and the second resource pool is a licensed spectrum resource.

Optionally, the method further includes receiving, by the first UE, second maximum transmit power sent by the base station, where the second maximum transmit power is maximum transmit power that is indicated by the base station and that can be used when the first UE sends data on the second resource.

Optionally, the establishing, by first user equipment UE, a virtual cell includes sending, by the first UE, a virtual cell establishment request message to a base station, where the virtual cell establishment request message is used to trigger the base station to schedule a fourth resource and a fifth resource of the first UE, the fourth resource is used to establish a random access channel of the virtual cell, and the fifth resource is used to establish a data channel and a control channel of the virtual cell, and generate a reference signal corresponding to the data channel and a reference signal corresponding to the control channel, and obtaining, by the first UE, the fourth resource and the fifth resource, establishing the random access channel of the virtual cell by using the fourth resource, and by using the fifth resource, establishing the data channel and the control channel, and generating the reference signal corresponding to the data channel and the reference signal corresponding to the control channel.

In this embodiment of the present invention, the base station directly and specifically indicates the fourth resource and the fifth resource, where the fourth resource is used by the first UE to establish the random access channel of the virtual cell, and the fifth resource is used by the first UE to establish the data channel and the control channel of the virtual cell, and generate the reference signal corresponding to the data channel and the reference signal corresponding to the control channel. A resource pool in which the fourth resource is located and a resource pool in which the fifth resource is located do no intersect in time domain and/or in frequency domain, in other words, are mutually independent. When the first UE needs to establish the random access channel, the first UE only needs to obtain a resource from the resource pool corresponding to the fourth resource. When the first UE needs to establish the data channel and the control channel of the virtual cell, and generate the reference signal corresponding to the data channel and the reference signal corresponding to the control channel, the first UE only needs to obtain a resource from the resource pool corresponding to the fifth resource. This improves both resource scheduling efficiency and flexibility of scheduling performed by the base station.

The following describes a method for communication between user equipments according to an embodiment of the present invention. The method is corresponding to the foregoing method. Corresponding content and technical effects are the same. Details are not described herein again.

According to a second aspect, an embodiment of the present invention provides a method for communication between user equipments, including receiving, by a base station, a virtual cell establishment request message sent by first user equipment UE, and scheduling, by the base station, a first resource based on the virtual cell establishment request message, where the first resource is used by the first UE to establish a random access channel, a data channel, and a control channel of a virtual cell, and used by the first UE to generate a reference signal corresponding to the data channel and a reference signal corresponding to the control channel, so that by using the first resource, the first UE establishes the random access channel, the data channel, and the control channel of the virtual cell, and generates the reference signal corresponding to the data channel and the reference signal corresponding to the control channel.

Optionally, the method further includes sending, by the base station, first maximum transmit power to the first UE, where the first maximum transmit power is maximum transmit power that is indicated by the base station and that can be used when the first UE sends data on the first resource or when second UE accesses the virtual cell.

Optionally, the method further includes receiving, by the base station, an identity and signal quality that are of a virtual cell established by third UE and that are sent by the first UE, and scheduling, by the base station, a second resource for the first UE based on the identity and the signal quality of the virtual cell established by the third UE, where the second resource is used by the first UE to send a first synchronization signal and a first broadcast message, the first synchronization signal includes an identity of the virtual cell, and the first broadcast message includes configuration information of the virtual cell, where a first resource pool in which the first resource is located and a second resource pool in which the second resource is located do no intersect in time domain and/or in frequency domain, and the third UE is UE that has established a virtual cell by using a third resource in the second resource pool.

Optionally, before the receiving, by the base station, an identity and signal quality that are of a virtual cell established by third UE and that are sent by the first UE, the method further includes sending, by the base station, a second broadcast message to the first UE, where the second broadcast message is used to broadcast time domain information and frequency domain information of the second resource pool in which the second resource is located, so that the first UE determines the second resource pool based on the time domain information and the frequency domain information, and determines the third UE that has established the virtual cell by using the third resource in the second resource pool.

Optionally, the first resource pool is an unlicensed spectrum resource, and the second resource pool is a licensed spectrum resource.

Optionally, second maximum transmit power is maximum transmit power that is indicated by the base station and that can be used when the first UE sends data on the second resource.

According to a third aspect, an embodiment of the present invention provides a method for communication between user equipments, including receiving, by a base station, a virtual cell establishment request message sent by first user equipment UE, and scheduling, by the base station, a fourth resource and a fifth resource of the first UE based on the virtual cell establishment request message, where the fourth resource is used to establish a random access channel of a virtual cell, and the fifth resource is used to establish a data channel and a control channel of the virtual cell, and generate a reference signal corresponding to the data channel and a reference signal corresponding to the control channel, so that the first UE establishes the random access channel of the virtual cell by using the fourth resource, and by using the fifth resource, establishes the data channel and the control channel, and generates the reference signal corresponding to the data channel and the reference signal corresponding to the control channel.

The following describes user equipment provided in an embodiment of the present invention. The user equipment is partially corresponding to the foregoing method executed by the first UE. Corresponding content and technical effects are the same. Details are not described herein again.

According to a fourth aspect, an embodiment of the present invention provides user equipment, including an establishment module, configured to establish a virtual cell, and a sending module, configured to send a first synchronization signal and a first broadcast message, where the first synchronization signal includes an identity of the virtual cell, and the first broadcast message includes configuration information of the virtual cell, so that based on the identity of the virtual cell and the configuration information of the virtual cell, second UE accesses the virtual cell and communicates with the user equipment.

Optionally, the sending module is further configured to send a virtual cell establishment request message to a base station, where the virtual cell establishment request message is used to trigger the base station to schedule a first resource, and the first resource is used by the user equipment to establish a random access channel, a data channel, and a control channel of the virtual cell, and generate a reference signal corresponding to the data channel and a reference signal corresponding to the control channel, and the establishment module is specifically configured to obtain the first resource, and by using the first resource, establish the random access channel, the data channel, and the control channel of the virtual cell, and generate the reference signal corresponding to the data channel and the reference signal corresponding to the control channel.

Optionally, the user equipment further includes a receiving module, configured to receive first maximum transmit power sent by the base station, where the first maximum transmit power is maximum transmit power that is indicated by the base station and that can be used when the user equipment sends data on the first resource or when the second UE accesses the virtual cell.

Optionally, the user equipment further includes an obtaining module, configured to obtain an identity and signal quality of a virtual cell established by third UE, and the sending module is further configured to send the identity and the signal quality of the virtual cell established by the third UE to the base station, so that the base station schedules a second resource for the first UE based on the identity and the signal quality of the virtual cell established by the third UE, where the second resource is used by the user equipment to send the first synchronization signal and the first broadcast message, where a first resource pool in which the first resource is located and a second resource pool in which the second resource is located do no intersect in time domain and/or in frequency domain, and the third UE is UE that has established a virtual cell by using a third resource in the second resource pool.

Optionally, the user equipment further includes a determining module, the receiving module is further configured to receive a second broadcast message sent by the base station, where the second broadcast message is used to broadcast time domain information and frequency domain information of the second resource pool, and the determining module is configured to determine the second resource pool based on the time domain information and the frequency domain information, and determine the third UE.

Optionally, the obtaining module is specifically configured to receive a second synchronization signal sent by the third UE, and determine, based on the second synchronization signal, the identity and the signal quality of the virtual cell established by the third UE.

Optionally, the first resource pool is an unlicensed spectrum resource, and the second resource pool is a licensed spectrum resource.

Optionally, the receiving module is further configured to receive second maximum transmit power sent by the base station, where the second maximum transmit power is maximum transmit power that is indicated by the base station and that can be used when the user equipment sends data on the second resource.

Optionally, the establishment module is specifically configured to send a virtual cell establishment request message to a base station, where the virtual cell establishment request message is used to trigger the base station to schedule a fourth resource and a fifth resource of the user equipment, the fourth resource is used to establish a random access channel of the virtual cell, and the fifth resource is used to establish a data channel and a control channel of the virtual cell, and generate a reference signal corresponding to the data channel and a reference signal corresponding to the control channel, and obtain the fourth resource and the fifth resource, establish the random access channel of the virtual cell by using the fourth resource, and by using the fifth resource, establish the data channel and the control channel, and generate the reference signal corresponding to the data channel and the reference signal corresponding to the control channel.

The following describes a base station provided in an embodiment of the present invention. The base station is partially corresponding to the second aspect and optional methods in the second aspect. Corresponding content and technical effects are the same. Details are not described herein again.

According to a fifth aspect, an embodiment of the present invention provides a base station, including a receiving module, configured to receive a virtual cell establishment request message sent by first user equipment UE, and a scheduling module, configured to schedule a first resource based on the virtual cell establishment request message, where the first resource is used by the first UE to establish a random access channel, a data channel, and a control channel of a virtual cell, and used by the first UE to generate a reference signal corresponding to the data channel and a reference signal corresponding to the control channel, so that by using the first resource, the first UE establishes the random access channel, the data channel, and the control channel of the virtual cell, and generates the reference signal corresponding to the data channel and the reference signal corresponding to the control channel.

Optionally, the base station further includes a sending module, configured to send first maximum transmit power to the first UE, where the first maximum transmit power is maximum transmit power that is indicated by the base station and that can be used when the first UE sends data on the first resource or when second UE accesses the virtual cell.

Optionally, the receiving module is further configured to receive an identity and signal quality that are of a virtual cell established by third UE and that are sent by the first UE, and the scheduling module is further configured to schedule a second resource for the first UE based on the identity and the signal quality of the virtual cell established by the third UE, where the second resource is used by the first UE to send a first synchronization signal and a first broadcast message, the first synchronization signal includes an identity of the virtual cell, and the first broadcast message includes configuration information of the virtual cell, where a first resource pool in which the first resource is located and a second resource pool in which the second resource is located do no intersect in time domain and/or in frequency domain, and the third UE is UE that has established a virtual cell by using a third resource in the second resource pool.

Optionally, the sending module is further configured to send a second broadcast message to the first UE, where the second broadcast message is used to broadcast time domain information and frequency domain information of the second resource pool in which the second resource is located, so that the first UE determines the second resource pool based on the time domain information and the frequency domain information, and determines the third UE that has established the virtual cell by using the third resource in the second resource pool.

Optionally, the first resource pool is an unlicensed spectrum resource, and the second resource pool is a licensed spectrum resource.

Optionally, the second maximum transmit power is maximum transmit power that is indicated by the base station and that can be used when the first UE sends data on the second resource.

The following describes a base station provided in an embodiment of the present invention. The base station is partially corresponding to the execution method in the third aspect. Corresponding content and technical effects are the same. Details are not described herein again.

According to a sixth aspect, an embodiment of the present invention provides a base station, including a receiving module, configured to receive a virtual cell establishment request message sent by first user equipment UE, and a scheduling module, configured to schedule a fourth resource and a fifth resource of the first UE based on the virtual cell establishment request message, where the fourth resource is used to establish a random access channel of a virtual cell, and the fifth resource is used to establish a data channel and a control channel of the virtual cell, and generate a reference signal corresponding to the data channel and a reference signal corresponding to the control channel, so that the first UE establishes the random access channel of the virtual cell by using the fourth resource, and by using the fifth resource, establishes the data channel and the control channel, and generates the reference signal corresponding to the data channel and the reference signal corresponding to the control channel.

The following describes user equipment provided in an embodiment of the present invention. The user equipment is partially corresponding to the foregoing method executed by the first UE. Corresponding content and technical effects are the same. Details are not described herein again.

According to a seventh aspect, an embodiment of the present invention provides user equipment, including a processor, configured to establish a virtual cell, and a transmitter, configured to send a first synchronization signal and a first broadcast message, where the first synchronization signal includes an identity of the virtual cell, and the first broadcast message includes configuration information of the virtual cell, so that based on the identity of the virtual cell and the configuration information of the virtual cell, second user equipment UE accesses the virtual cell and communicates with the user equipment.

Optionally, the transmitter is further configured to send a virtual cell establishment request message to a base station, where the virtual cell establishment request message is used to trigger the base station to schedule a first resource, and the first resource is used by the user equipment to establish a random access channel, a data channel, and a control channel of the virtual cell, and generate a reference signal corresponding to the data channel and a reference signal corresponding to the control channel, and the processor is specifically configured to obtain the first resource, and by using the first resource, establish the random access channel, the data channel, and the control channel of the virtual cell, and generate the reference signal corresponding to the data channel and the reference signal corresponding to the control channel.

Optionally, the user equipment further includes a receiver, configured to receive first maximum transmit power sent by the base station, where the first maximum transmit power is maximum transmit power that is indicated by the base station and that can be used when the user equipment sends data on the first resource or when the second UE accesses the virtual cell.

Optionally, the processor is further configured to obtain an identity and signal quality of a virtual cell established by third UE, and the transmitter is further configured to send the identity and the signal quality of the virtual cell established by the third UE to the base station, so that the base station schedules a second resource for the user equipment based on the identity and the signal quality of the virtual cell established by the third UE, where the second resource is used by the user equipment to send the first synchronization signal and the first broadcast message, where a first resource pool in which the first resource is located and a second resource pool in which the second resource is located do no intersect in time domain and/or in frequency domain, and the third UE is UE that has established a virtual cell by using a third resource in the second resource pool.

Optionally, the receiver is further configured to receive a second broadcast message sent by the base station, where the second broadcast message is used to broadcast time domain information and frequency domain information of the second resource pool, and the processor is further configured to determine the second resource pool based on the time domain information and the frequency domain information, and determine the third UE.

Optionally, the receiver is further configured to receive a second synchronization signal sent by the third UE, and the processor is specifically configured to determine, based on the second synchronization signal, the identity and the signal quality of the virtual cell established by the third UE.

Optionally, the first resource pool is an unlicensed spectrum resource, and the second resource pool is a licensed spectrum resource.

Optionally, the receiver is further configured to receive second maximum transmit power sent by the base station, where the second maximum transmit power is maximum transmit power that is indicated by the base station and that can be used when the first UE sends data on the second resource.

Optionally, the transmitter is further configured to send a virtual cell establishment request message to a base station, where the virtual cell establishment request message is used to trigger the base station to schedule a fourth resource and a fifth resource of the user equipment, the fourth resource is used to establish a random access channel of the virtual cell, and the fifth resource is used to establish a data channel and a control channel of the virtual cell, and generate a reference signal corresponding to the data channel and a reference signal corresponding to the control channel, and the processor is specifically configured to obtain the fourth resource and the fifth resource, establish the random access channel of the virtual cell by using the fourth resource, and by using the fifth resource, establish the data channel and the control channel, and generate the reference signal corresponding to the data channel and the reference signal corresponding to the control channel.

The following describes a base station provided in an embodiment of the present invention. The base station is partially corresponding to the second aspect and optional methods in the second aspect. Corresponding content and technical effects are the same. Details are not described herein again.

According to an eighth aspect, an embodiment of the present invention provides a base station, including a receiver, configured to receive a virtual cell establishment request message sent by first user equipment UE, and a processor, configured to schedule a first resource based on the virtual cell establishment request message, where the first resource is used by the first UE to establish a random access channel, a data channel, and a control channel of a virtual cell, and used by the first UE to generate a reference signal corresponding to the data channel and a reference signal corresponding to the control channel, so that by using the first resource, the first UE establishes the random access channel, the data channel, and the control channel of the virtual cell, and generates the reference signal corresponding to the data channel and the reference signal corresponding to the control channel.

Optionally, the base station further includes a transmitter, configured to send first maximum transmit power to the first UE, where the first maximum transmit power is maximum transmit power that is indicated by the base station and that can be used when the first UE sends data on the first resource or when second UE accesses the virtual cell.

Optionally, the receiver is further configured to receive an identity and signal quality that are of a virtual cell established by third UE and that are sent by the first UE, and the processor is further configured to schedule a second resource for the first UE based on the identity and the signal quality of the virtual cell established by the third UE, where the second resource is used by the first UE to send a first synchronization signal and a first broadcast message, the first synchronization signal includes an identity of the virtual cell, and the first broadcast message includes configuration information of the virtual cell, where a first resource pool in which the first resource is located and a second resource pool in which the second resource is located do no intersect in time domain and/or in frequency domain, and the third UE is UE that has established a virtual cell by using a third resource in the second resource pool.

Optionally, the transmitter is further configured to send a second broadcast message to the first UE, where the second broadcast message is used to broadcast time domain information and frequency domain information of the second resource pool in which the second resource is located, so that the first UE determines the second resource pool based on the time domain information and the frequency domain information, and determines the third UE that has established the virtual cell by using the third resource in the second resource pool.

Optionally, the first resource pool is an unlicensed spectrum resource, and the second resource pool is a licensed spectrum resource.

Optionally, the second maximum transmit power is maximum transmit power that is indicated by the base station and that can be used when the first UE sends data on the second resource.

The following describes a base station provided in an embodiment of the present invention. The base station is partially corresponding to the execution method in the third aspect. Corresponding content and technical effects are the same. Details are not described herein again.

According to a ninth aspect, an embodiment of the present invention provides a base station, including a receiver, configured to receive a virtual cell establishment request message sent by first user equipment UE, and a processor, configured to schedule a fourth resource and a fifth resource of the first UE based on the virtual cell establishment request message, where the fourth resource is used to establish a random access channel of a virtual cell, and the fifth resource is used to establish a data channel and a control channel of the virtual cell, and generate a reference signal corresponding to the data channel and a reference signal corresponding to the control channel, so that the first UE establishes the random access channel of the virtual cell by using the fourth resource, and by using the fifth resource, establishes the data channel and the control channel, and generates the reference signal corresponding to the data channel and the reference signal corresponding to the control channel.

The embodiments of the present invention provide the method for communication between user equipments, the user equipment, and the base station. The method includes establishing, by the first UE, the virtual cell, and sending, by the first UE, the first synchronization signal and the first broadcast message, where the first synchronization signal includes the identity of the virtual cell, and the first broadcast message includes the configuration information of the virtual cell, so that based on the identity of the virtual cell and the configuration information of the virtual cell, the second UE accesses the virtual cell and communicates with the first UE. In the communication method, the first UE and the second UE do not need to have equivalent communication capabilities. Therefore, for the low-performance second UE, this communication manner can reduce power consumption of the second UE.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

To resolve a prior-art problem that establishment of a D2D connection between high-performance user equipment and low-performance user equipment causes relatively large power consumption of the low-performance user equipment, the embodiments of the present invention provide a method for communication between user equipments, an apparatus, user equipment, and a base station. In the embodiments of the present invention, first UE establishes a virtual cell, so that second UE accesses the virtual cell, to implement a communication process between the first UE and the second UE, thereby reducing power consumption of the second UE. It should be noted that, in the embodiments of the present invention, the first UE is the foregoing high-performance UE and the second UE is the foregoing low-performance UE.

Figure 1:
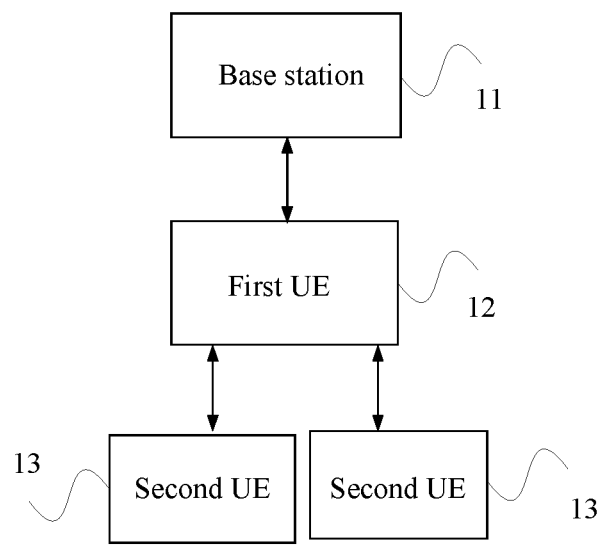
FIG. 1 is an architectural diagram of a communications system between user equipments according to an embodiment of the present invention.

FIG. 1 is an architectural diagram of a communications system between user equipments according to an embodiment of the present invention. As shown in FIG. 1, the system includes a base station 11, at least one first UE 12 (as shown in FIG. 1, one first UE is included), and at least one second UE 13. The base station 11 mainly schedules a resource required by the first UE 12. The first UE 12 is configured to establish a virtual cell by using the resource that is scheduled by the base station for the first UE 12, and send a first synchronization signal and a first broadcast message to the second UE 13 by using the scheduled resource. The second UE 13 accesses, based on the first synchronization signal and the first broadcast message, the virtual cell established by the first UE 12, to implement a communication process between the first UE 12 and the second UE 13.

Figure 2:
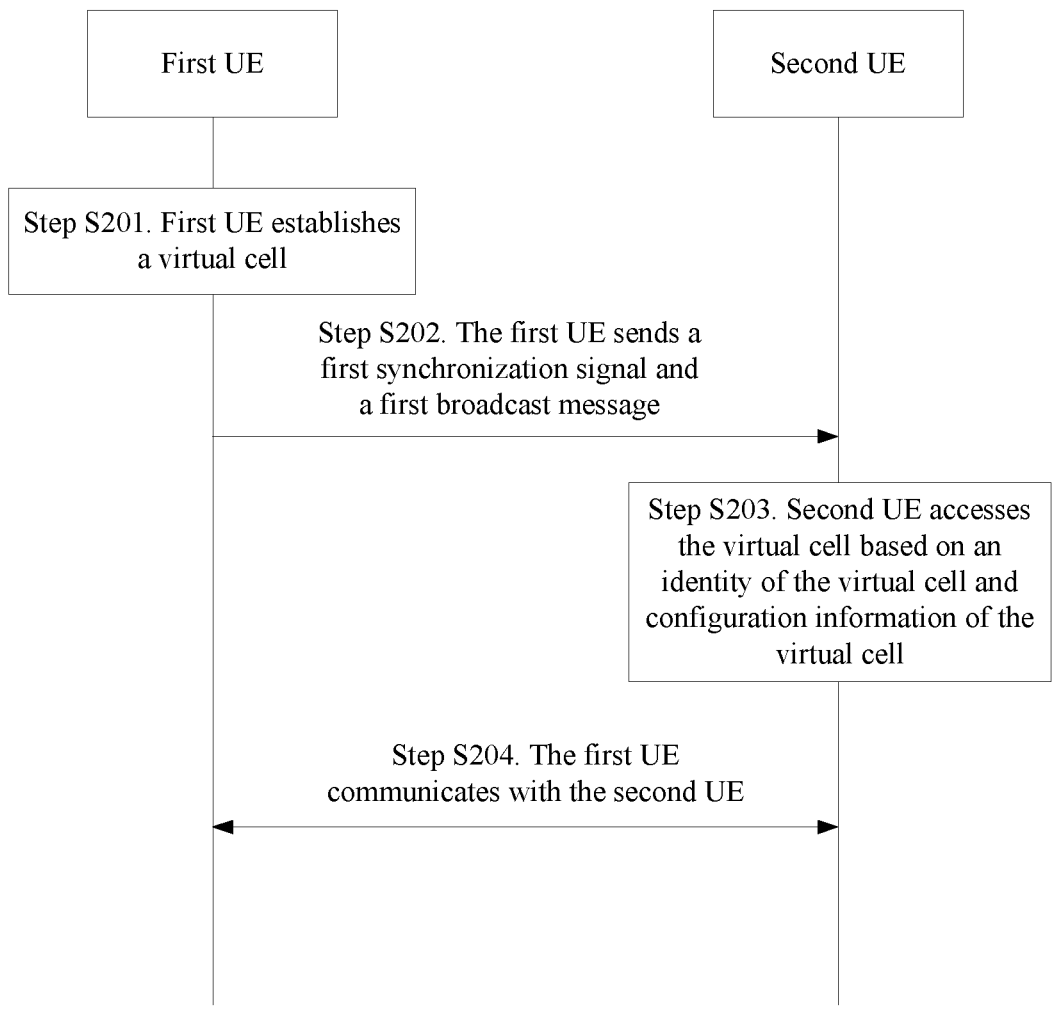
FIG. 2 is an interaction flowchart of a method for communication between user equipments according to an embodiment of the present invention.

Based on the architectural diagram of the communications system between user equipments in FIG. 1, an embodiment of the present invention provides a method for communication between user equipments. Specifically, FIG. 2 is an interaction flowchart of a method for communication between user equipments according to an embodiment of the present invention. As shown in FIG. 2, the method includes the following process.

Step S201. First user equipment UE establishes a virtual cell.

The establishing, by first UE, a virtual cell includes establishing a physical random access channel (hereinafter referred to as a random access channel), a physical data channel (hereinafter referred to as a data channel), and a physical control channel (hereinafter referred to as a control channel) of the virtual cell, generating a reference signal corresponding to the data channel and a reference signal corresponding to the control channel, and the like.

Step S202. The first UE sends a first synchronization signal and a first broadcast message.

The first synchronization signal includes an identity (ID) of the virtual cell. A physical layer format of the first synchronization signal may keep consistent with a design of a synchronization signal in a Narrowband Internet of Things (NB-IoT) subframe in LTE, so as to minimize modification based on a standard. The first broadcast message includes configuration information of the virtual cell. The configuration information of the virtual cell includes configuration information of a resource pool used to establish the random access channel of the virtual cell, including time domain information, frequency domain information, and allowed maximum transmit power of the resource pool, and configuration information of a resource pool used to establish the data channel and the control channel of the virtual cell and generate the reference signal corresponding to the data channel and the reference signal corresponding to the control channel, including time domain information, frequency domain information, and allowed maximum transmit power of the resource pool. The two resource pools may be a same resource pool, or may be two mutually independent resource pools.

Step S203. Second UE accesses the virtual cell based on an identity of the virtual cell and configuration information of the virtual cell.

First, the second UE searches for at least one virtual cell based on the identity of the virtual cell and the configuration information of the virtual cell. For example, the second UE selects, based on a resource pool of a random access channel corresponding to each virtual cell, a virtual cell whose maximum transmit power is greater than a first threshold, or the second UE selects, based on the resource pool used to establish the data channel and the control channel of the virtual cell and generate the reference signal corresponding to the data channel and the reference signal corresponding to the control channel, a virtual cell whose maximum transmit power is greater than a second threshold.

Second, the second UE determines, based on the identity of the virtual cell, whether the found at least one virtual cell is a virtual cell that the second UE has accessed. The second UE stores an identity of a historically accessed virtual cell. The second UE matches an identity of the found at least one virtual cell and the identity of the historically accessed virtual cell. When only one virtual cell is matched, the virtual cell is used as the access cell. When a plurality of virtual cells are matched, one virtual cell is randomly selected from the plurality of virtual cells and is used as the access cell.

Alternatively, the second UE selects, as the access cell, a virtual cell closest to the second UE or a virtual cell with maximum power.

It should be noted that a manner of accessing the virtual cell by the second UE is not limited thereto.

Step S204. The first UE communicates with the second UE.

The second UE uses the first UE as a base station, and communicates with the first UE by using the virtual cell established by the base station.

This embodiment of the present invention provides the method for communication between user equipments. The first UE establishes the virtual cell, so that the second UE accesses the virtual cell, so that the first UE communicates with the second UE. In the communication method, the first UE and the second UE do not need to have equivalent communication capabilities. Therefore, for the low-performance second UE, this communication manner can reduce power consumption of the second UE.

Figure 3:
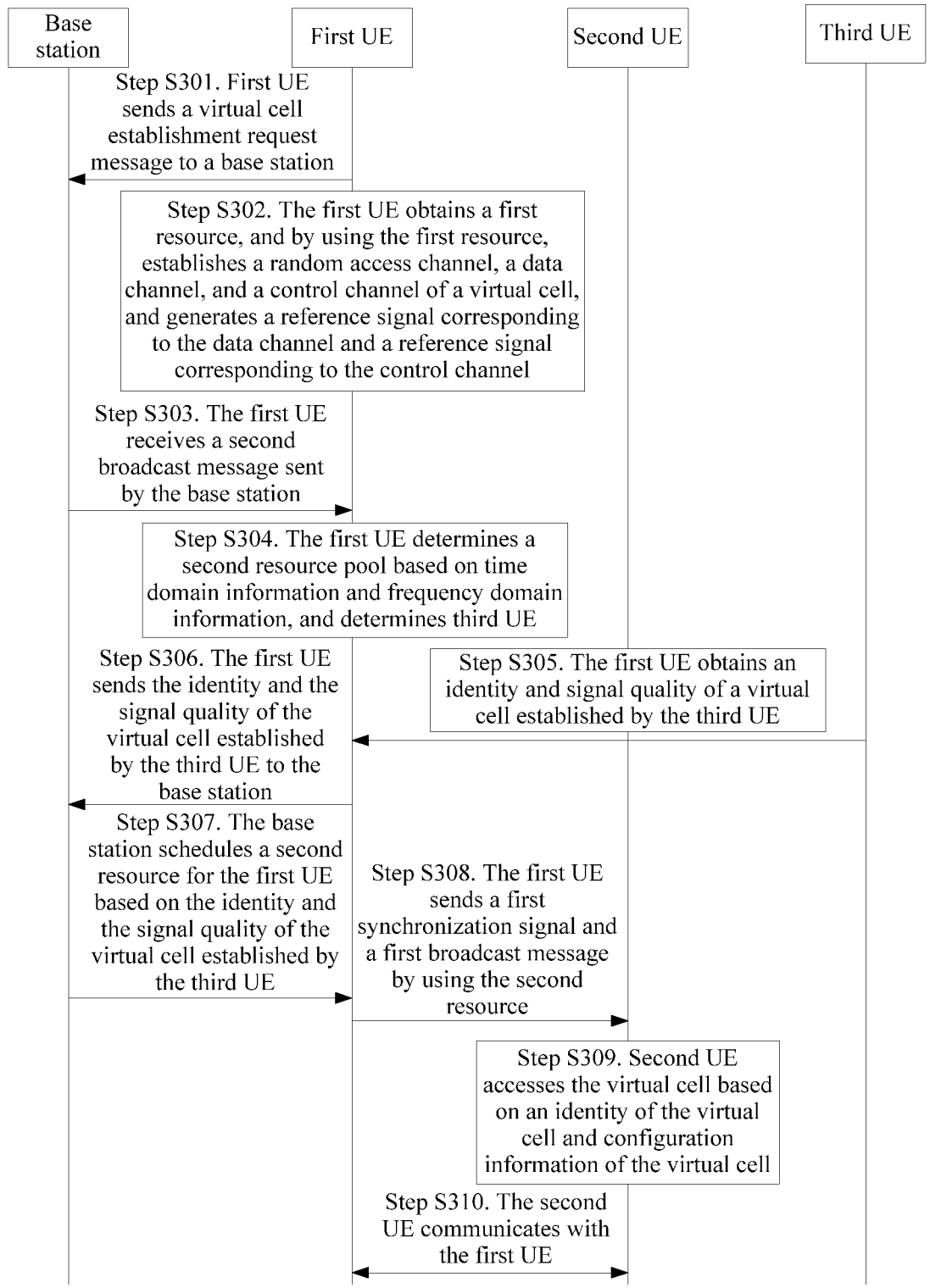
FIG. 3 is an interaction flowchart of a method for communication between user equipments according to another embodiment of the present invention.

Based on the foregoing embodiment, the following further details step S201 and step S202. Specifically, FIG. 3 is an interaction flowchart of a method for communication between user equipments according to another embodiment of the present invention. As shown in FIG. 3, the method includes the following process.

Step S301. First UE sends a virtual cell establishment request message to a base station.

The virtual cell establishment request message is used to trigger the base station to schedule a first resource. The first resource is used by the first UE to establish a random access channel, a data channel, and a control channel of a virtual cell, and generate a reference signal corresponding to the data channel and a reference signal corresponding to the control channel. The virtual cell establishment request message is uplink control information.

Step S302. The first UE obtains a first resource, and by using the first resource, establishes a random access channel, a data channel, and a control channel of a virtual cell, and generates a reference signal corresponding to the data channel and a reference signal corresponding to the control channel.

A first resource pool in which the first resource is located is an unlicensed spectrum resource. After the base station determines the first resource, the base station may notify the first UE of a position of the first resource. The position includes time domain information and frequency domain information of the first resource. The first UE obtains the first resource based on the position of the first resource, and by using the first resource, establishes the random access channel, the data channel, and the control channel of the virtual cell, and generates the reference signal corresponding to the data channel and the reference signal corresponding to the control channel. In other words, the first UE establishes the virtual cell by using the first resource. To be specific, the first UE may determine, based on the time domain information and the frequency domain information of the first resource, which frequency bands or resource blocks (RB) or resource elements (RE) are used to establish the random access channel, the data channel, and the control channel, or generate the reference signal corresponding to the data channel and the reference signal corresponding to the control channel.

Specifically, the first UE separates a fourth resource and a fifth resource from the first resource, where the fourth resource is used to establish the random access channel of the virtual cell, and the fifth resource is used to establish the data channel and the control channel of the virtual cell, and generate the reference signal corresponding to the data channel and the reference signal corresponding to the control channel.

Optionally, the method further includes receiving, by the first UE, first maximum transmit power sent by the base station, where the first maximum transmit power is maximum transmit power that is indicated by the base station and that can be used when the first UE sends data on the first resource or when the second UE accesses the virtual cell.

Step S303. The first UE receives a second broadcast message sent by the base station.

Step S304. The first UE determines a second resource pool based on time domain information and frequency domain information, and determines third UE.

Description is provided with reference to step S303 and step S304. The second broadcast message is used to broadcast the time domain information and the frequency domain information of the second resource pool in which a second resource is located. The second resource is used by the first UE to send a first synchronization signal and a first broadcast message. The first synchronization signal includes an identity of the virtual cell, and the first broadcast message includes configuration information of the virtual cell. The first resource pool in which the first resource is located and the second resource pool in which the second resource is located do no intersect in time domain and/or in frequency domain.

Figure 4:
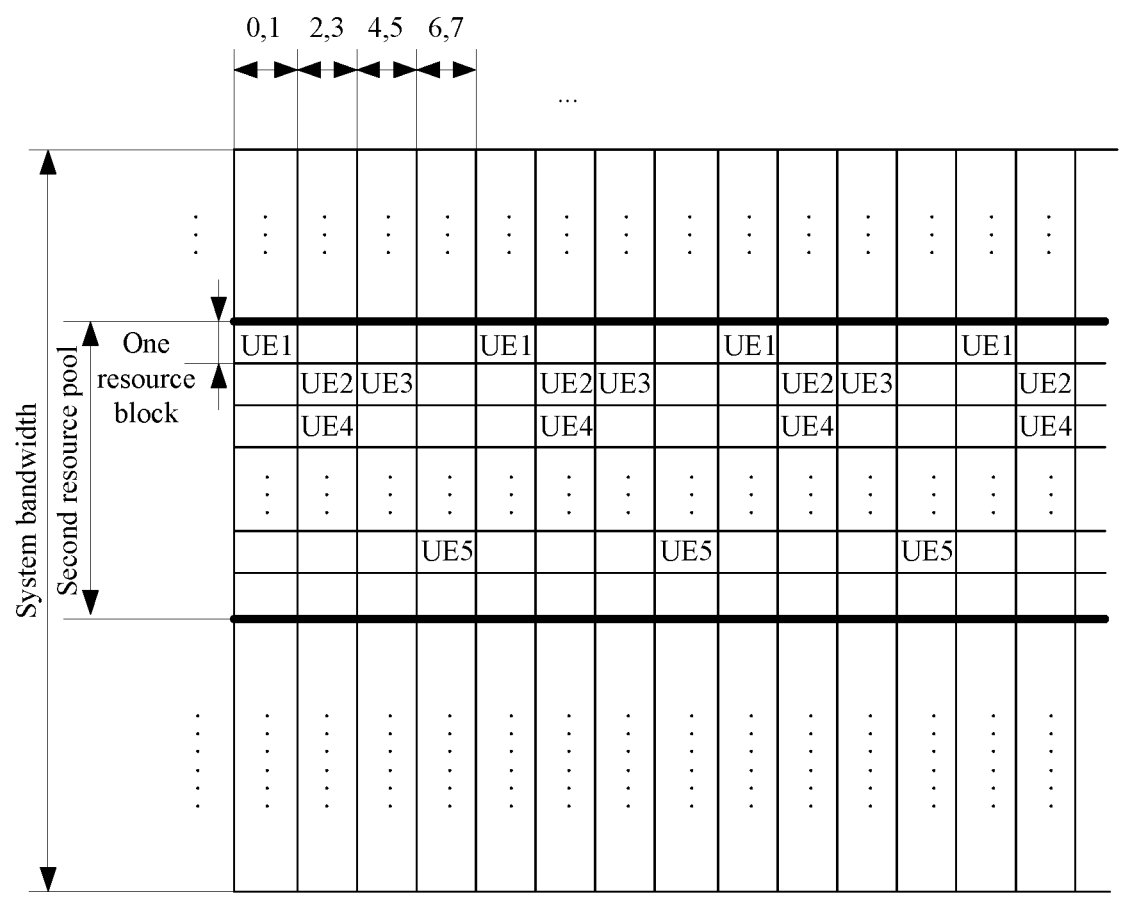
FIG. 4 is a schematic diagram of a second resource pool according to an embodiment of the present invention.

The second resource pool in which the second resource is located is partial bandwidth of system bandwidth, that is, the second resource pool is a licensed spectrum resource. FIG. 4 is a schematic diagram of the second resource pool according to an embodiment of the present invention. As shown in FIG. 4, the base station reserves, from the system bandwidth, the second resource pool that is used by the first UE to send the first synchronization signal and the first broadcast message. Each UE in FIG. 4 may be the first UE or may be the third UE. The third UE is UE that has established a virtual cell by using a third resource in the second resource pool. All UEs that have sent a synchronization signal and a broadcast message in the second resource pool, excluding the first UE, are third UEs. The system bandwidth may be system bandwidth of downlink transmission, or may be system bandwidth of uplink transmission. The second resource pool occupies some spectrum resources of the system bandwidth and all timeslots. A central position and a width of the second resource pool may be configured by the base station, in other words, the time domain information and the frequency domain information of the second resource pool are configured by the base station. Specifically, the base station may perform semi-static configuration on a center, the width, and the like of the second resource pool based on a feedback of another first UE, including an ID, channel quality, and the like of a virtual cell established by the another first UE, that is, configure the time domain information and the frequency domain information of the second resource pool.

In the second resource pool, a minimum element may be bandwidth of one RB and duration of two subframes. The first UE may occupy some time-frequency resources in the minimum element based on a period, and use the time-frequency resources as the second resource for sending the first synchronization signal and the first broadcast message. For each first UE, a period of repeatedly sending the first synchronization signal and the first broadcast message by the first UE is a system parameter and is configured by a higher layer in a quasi-static manner. A period shown in FIG. 4 may be considered as 4, namely, a length of 8 radio frames.

Step S305. The first UE obtains an identity and signal quality of a virtual cell established by the third UE.

Specifically, the first UE receives a second synchronization signal sent by the third UE, and the first UE determines, based on the second synchronization signal, the identity and the signal quality of the virtual cell established by the third UE. The second synchronization message includes the identity of the virtual cell established by the third UE and at least one sequence. The at least one sequence is used to determine the signal quality of the virtual cell established by the third UE.

Step S306. The first UE sends the identity and the signal quality of the virtual cell established by the third UE to the base station.

Step S307. The base station schedules a second resource for the first UE based on the identity and the signal quality of the virtual cell established by the third UE.

Description is provided with reference to step S306 and step S307. The first UE packages an identity and signal quality of at least one virtual cell established by the third UE, and sends the identity and the signal quality to the base station in a form of a data packet. The base station schedules a segment of relatively "silent" resources for the first UE based on the identity and the signal quality of the virtual cell established by the third UE. Better signal quality on a resource indicates that the resource is busier, and poorer signal quality on a resource indicates that the resource is idler. Therefore, the base station may determine a preset value. When the base station determines, after learning of signal quality of a virtual cell, that the signal quality is less than the preset value, the base station selects the resource as the second resource. When there are a plurality of resources whose signal quality is less than the preset value, one of the plurality of resources may be randomly selected as the second resource, or a resource with lowest signal quality is selected as the second resource.

It should be noted that if a third UE is not within coverage of the first UE, the first UE may also use a third resource of the third UE.

Step S308. The first UE sends a first synchronization signal and a first broadcast message by using the second resource.

A physical layer format of the first synchronization signal may keep consistent with a design of a synchronization signal in an NB-IoT subframe in LTE, so as to minimize modification based on a standard. The first synchronization signal includes the identity of the virtual cell, and the first broadcast message includes the configuration information of the virtual cell.

Optionally, the method further includes receiving, by the first UE, second maximum transmit power sent by the base station, where the second maximum transmit power is maximum transmit power that is indicated by the base station and that can be used when the first UE sends data on the second resource. The data is the first synchronization signal or the first broadcast message. In other words, the second maximum transmit power is maximum transmit power that is specified by the base station and that can be used when the first UE sends the first synchronization signal or the first broadcast message.

Step S309. Second UE accesses the virtual cell based on an identity of the virtual cell and configuration information of the virtual cell.

Step S310. The second UE communicates with the first UE.

This embodiment of the present invention provides the method for communication between user equipments. The first UE establishes the virtual cell, so that the second UE accesses the virtual cell, to implement communication between the first UE and the second UE. In the communication method, the first UE and the second UE do not need to have equivalent communication capabilities. Therefore, for the low-performance second UE, this communication manner can reduce power consumption of the second UE. Further, in this embodiment of the present invention, the first resource pool in which the first resource scheduled for the first UE to establish the virtual cell is located and the second resource pool in which the second resource used to send the first synchronization signal and the first broadcast message is located do no intersect, in other words, are mutually separated. In this way, the first UE only needs to monitor, in the second resource pool, the third UE that has sent the synchronization signal and the broadcast message, instead of performing monitoring in both the first resource pool and the second resource pool, thereby improving monitoring efficiency. The first UE establishes the virtual cell based on a monitoring result, thereby improving efficiency of establishing the virtual cell.

Further, the first resource used by the first UE to establish the virtual cell and the second resource for sending the first synchronization signal and the first broadcast message are obtained through coordination by the base station. Therefore, it can be ensured, through coordination by the base station, that the first UE uses a spectrum resource properly and orderly, thereby avoiding a spectrum conflict caused by excessively dense virtual cells. In addition, the base station directly sends configuration information of the random access channel, the data channel, the control channel, the reference signal corresponding to the data channel, and the reference signal corresponding to the control channel to UE. This can reduce signaling overheads.

Figure 5:
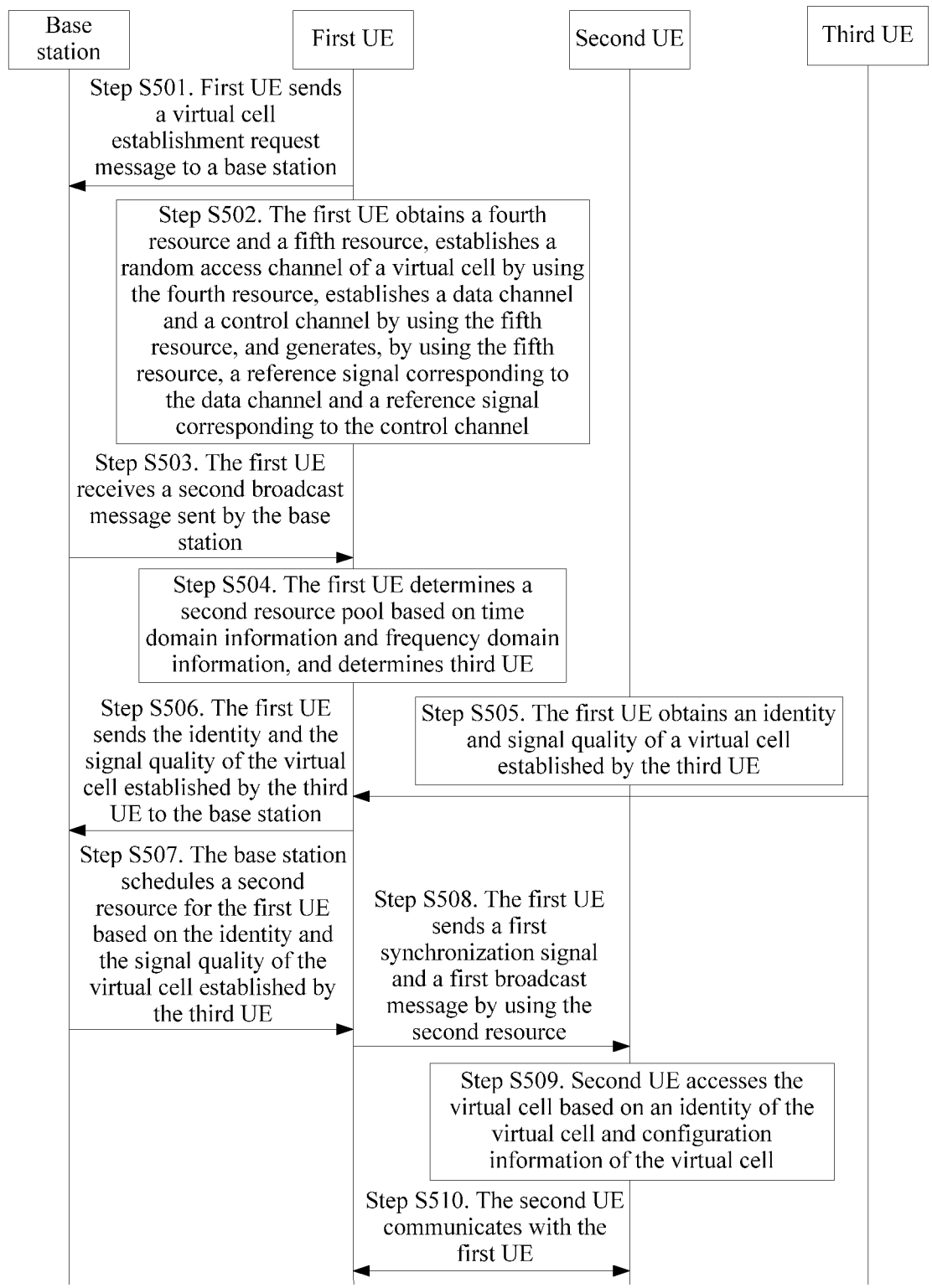
FIG. 5 is an interaction flowchart of a method for communication between user equipments according to still another embodiment of the present invention.

Based on the foregoing embodiment, the following further details step S201 and step S202. Specifically, FIG. 5 is an interaction flowchart of a method for communication between user equipments according to still another embodiment of the present invention. The embodiment corresponding to FIG. 5 and the embodiment corresponding to FIG. 3 are two parallel solutions. Specifically, as shown in FIG. 5, the method includes the following process.

Step S501. First UE sends a virtual cell establishment request message to a base station.

The virtual cell establishment request message is used to trigger the base station to schedule a fourth resource and a fifth resource, where the fourth resource is used by the first UE to establish a random access channel of a first virtual cell, and the fifth resource is used to establish a data channel and a control channel of the virtual cell, and generate a reference signal corresponding to the data channel and a reference signal corresponding to the control channel.

Step S502. The first UE obtains a fourth resource and a fifth resource, establishes the random access channel of a virtual cell by using the fourth resource, establishes a data channel and a control channel by using the fifth resource, and generates, by using the fifth resource, a reference signal corresponding to the data channel and a reference signal corresponding to the control channel.

Optionally, the method further includes receiving, by the first UE, third maximum transmit power and fourth maximum transmit power that are sent by the base station, where the third maximum transmit power is maximum transmit power that is indicated by the base station and that can be used when the first UE sends data on the fourth resource, and the fourth maximum transmit power is maximum transmit power that is indicated by the base station and that can be used when the first UE sends data on the fifth resource.

Step S503. The first UE receives a second broadcast message sent by the base station.

Step S504. The first UE determines a second resource pool based on time domain information and frequency domain information, and determines third UE.

Step S503 and step S504 are the same as step S403 and step S404. Details are not described herein again.

Step S505. The first UE obtains an identity and signal quality of a virtual cell established by the third UE.

Specifically, the first UE receives a second synchronization signal sent by the third UE, and the first UE determines, based on the second synchronization signal, the identity and the signal quality of the virtual cell established by the third UE. The second synchronization message includes the identity of the virtual cell established by the third UE and at least one sequence number. The at least one sequence number is used to determine the signal quality of the virtual cell established by the third UE.

Step S506. The first UE sends the identity and the signal quality of the virtual cell established by the third UE to the base station.

Step S507. The base station schedules a second resource for the first UE based on the identity and the signal quality of the virtual cell established by the third UE.

Description is provided with reference to step S506 and step S507. The first UE packages an identity and signal quality of at least one virtual cell established by the third UE, and sends the identity and the signal quality to the base station in a form of a data packet. The base station schedules a segment of relatively "silent" resources for the first UE based on the identity and the signal quality of the virtual cell established by the third UE. Better signal quality on a resource indicates that the resource is busier, and poorer signal quality on a resource indicates that the resource is idler. Therefore, the base station may determine a preset value. When the base station determines, after learning of signal quality of a virtual cell, that the signal quality is less than the preset value, the base station selects the resource as the second resource. When there are a plurality of resources whose signal quality is less than the preset value, one of the plurality of resources may be randomly selected as the second resource, or a resource with lowest signal quality is selected as the second resource.

It should be noted that if a third UE is not within coverage of the first UE, the first UE may also use a third resource of the third UE.

Step S508. The first UE sends a first synchronization signal and a first broadcast message by using the second resource.

A physical layer format of the first synchronization signal may keep consistent with a design of a synchronization signal in an NB-IoT subframe in LTE, so as to minimize modification based on a standard. The first synchronization signal includes an identity of the virtual cell, and the first broadcast message includes configuration information of the virtual cell.

Optionally, the method further includes receiving, by the first UE, second maximum transmit power sent by the base station, where the second maximum transmit power is maximum transmit power that is indicated by the base station and that can be used when the first UE sends data on the second resource. The data is the first synchronization signal or the first broadcast message. In other words, the second maximum transmit power is maximum transmit power that is specified by the base station and that can be used when the first UE sends the first synchronization signal or the first broadcast message.

Step S509. Second UE accesses the virtual cell based on an identity of the virtual cell and configuration information of the virtual cell.

Step S510. The second UE communicates with the first UE.

This embodiment of the present invention provides the method for communication between user equipments. The first UE establishes the virtual cell, so that the second UE accesses the virtual cell, to implement communication between the first UE and the second UE. In the communication method, the first UE and the second UE do not need to have equivalent communication capabilities. Therefore, for the low-performance second UE, this communication manner can reduce power consumption of the second UE. Further, in this embodiment of the present invention, a first resource pool in which a first resource scheduled for the first UE to establish the virtual cell is located and the second resource pool in which the second resource used to send the first synchronization signal and the first broadcast message is located do no intersect, in other words, are mutually separated. In this way, the first UE only needs to monitor, in the second resource pool, the third UE that has sent a synchronization signal and a broadcast message, instead of performing monitoring in both the first resource pool and the second resource pool, thereby improving monitoring efficiency. The first UE establishes the virtual cell based on a monitoring result, thereby improving efficiency of establishing the virtual cell. In addition, a difference between this method and the method in the foregoing embodiment is the base station directly and specifically indicates the fourth resource and the fifth resource, where the fourth resource is used by the first UE to establish the random access channel of the virtual cell, and the fifth resource is used by the first UE to establish the data channel and the control channel of the virtual cell, and generate the reference signal corresponding to the data channel and the reference signal corresponding to the control channel. A resource pool in which the fourth resource is located and a resource pool in which the fifth resource is located do no intersect in time domain and/or in frequency domain, in other words, are mutually independent. When the first UE needs to establish the random access channel, the first UE only needs to obtain a resource from the resource pool corresponding to the fourth resource. When the first UE needs to establish the data channel and the control channel of the virtual cell, and generate the reference signal corresponding to the data channel and the reference signal corresponding to the control channel, the first UE only needs to obtain a resource from the resource pool corresponding to the fifth resource. This improves both resource scheduling efficiency and flexibility of scheduling performed by the base station.

Figure 6:
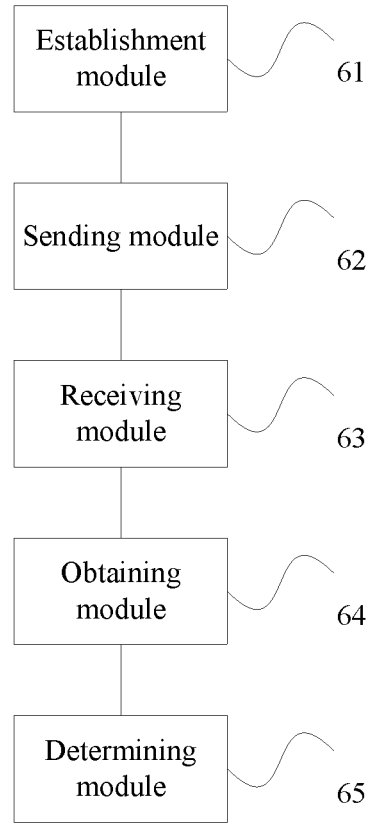
FIG. 6 is a schematic structural diagram of user equipment according to an embodiment of the present invention.

FIG. 6 is a schematic structural diagram of user equipment according to an embodiment of the present invention. The user equipment is the foregoing first UE. The user equipment includes an establishment module 61, configured to establish a virtual cell, and a sending module 62, configured to send a first synchronization signal and a first broadcast message, where the first synchronization signal includes an identity of the virtual cell, and the first broadcast message includes configuration information of the virtual cell, so that based on the identity of the virtual cell and the configuration information of the virtual cell, second UE accesses the virtual cell and communicates with the user equipment.

The present invention provides user equipment. The user equipment may be configured to perform method steps corresponding to the first UE in the embodiment shown in FIG. 2. Implementation principles and technical effects thereof are similar, and details are not described herein again.

Optionally, the sending module 62 is further configured to send a virtual cell establishment request message to a base station, where the virtual cell establishment request message is used to trigger the base station to schedule a first resource, and the first resource is used by the user equipment to establish a random access channel, a data channel, and a control channel of the virtual cell, and generate a reference signal corresponding to the data channel and a reference signal corresponding to the control channel, and the establishment module 61 is specifically configured to obtain the first resource, and by using the first resource, establish the random access channel, the data channel, and the control channel of the virtual cell, and generate the reference signal corresponding to the data channel and the reference signal corresponding to the control channel.

Optionally, the user equipment further includes a receiving module 63, configured to receive first maximum transmit power sent by the base station, where the first maximum transmit power is maximum transmit power that is indicated by the base station and that can be used when the user equipment sends data on the first resource or when the second UE accesses the virtual cell.

Optionally, the user equipment further includes an obtaining module 64, configured to obtain an identity and signal quality of a virtual cell established by third UE, and the sending module 62 is further configured to send the identity and the signal quality of the virtual cell established by the third UE to the base station, so that the base station schedules a second resource for the first UE based on the identity and the signal quality of the virtual cell established by the third UE, where the second resource is used by the user equipment to send the first synchronization signal and the first broadcast message.

A first resource pool in which the first resource is located and a second resource pool in which the second resource is located do no intersect in time domain and/or in frequency domain, and the third UE is UE that has established a virtual cell by using a third resource in the second resource pool.

Optionally, the user equipment further includes a determining module 65. The receiving module 63 is further configured to receive a second broadcast message sent by the base station, where the second broadcast message is used to broadcast time domain information and frequency domain information of the second resource pool, and the determining module 65 is configured to determine the second resource pool based on the time domain information and the frequency domain information, and determine the third UE.

Optionally, the obtaining module 64 is specifically configured to receive a second synchronization signal sent by the third UE, and determine, based on the second synchronization signal, the identity and the signal quality of the virtual cell established by the third UE.

Optionally, the first resource pool is an unlicensed spectrum resource, and the second resource pool is a licensed spectrum resource.

Optionally, the receiving module 63 is further configured to receive second maximum transmit power sent by the base station, where the second maximum transmit power is maximum transmit power that is indicated by the base station and that can be used when the user equipment sends data on the second resource.

The present invention provides user equipment. The user equipment may be configured to perform method steps corresponding to the first UE in the embodiment shown in FIG. 3. Implementation principles and technical effects thereof are similar, and details are not described herein again.

Optionally, the establishment module 61 is specifically configured to send a virtual cell establishment request message to a base station, where the virtual cell establishment request message is used to trigger the base station to schedule a fourth resource and a fifth resource of the user equipment, the fourth resource is used to establish a random access channel of the virtual cell, and the fifth resource is used to establish a data channel and a control channel of the virtual cell, and generate a reference signal corresponding to the data channel and a reference signal corresponding to the control channel, and obtain the fourth resource and the fifth resource, establish the random access channel of the virtual cell by using the fourth resource, and by using the fifth resource, establish the data channel and the control channel, and generate the reference signal corresponding to the data channel and the reference signal corresponding to the control channel.

The present invention provides user equipment. The user equipment may be configured to perform method steps corresponding to the first UE in the embodiment shown in FIG. 5. Implementation principles and technical effects thereof are similar, and details are not described herein again.

Figure 7:
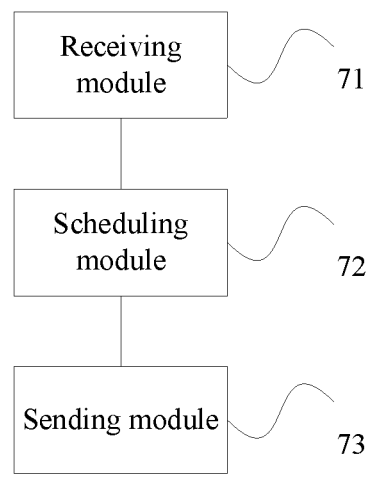
FIG. 7 is a schematic structural diagram of a base station according to an embodiment of the present invention.

FIG. 7 is a schematic structural diagram of a base station according to an embodiment of the present invention. As shown in FIG. 7, the base station includes a receiving module 71, configured to receive a virtual cell establishment request message sent by first user equipment UE, and a scheduling module 72, configured to schedule a first resource based on the virtual cell establishment request message, where the first resource is used by the first UE to establish a random access channel, a data channel, and a control channel of a virtual cell, and used by the first UE to generate a reference signal corresponding to the data channel and a reference signal corresponding to the control channel, so that by using the first resource, the first UE establishes the random access channel, the data channel, and the control channel of the virtual cell, and generates the reference signal corresponding to the data channel and the reference signal corresponding to the control channel.

The present invention provides a base station. The base station may be configured to perform method steps corresponding to the base station in the embodiment shown in FIG. 2. Implementation principles and technical effects thereof are similar, and details are not described herein again.

Optionally, the base station further includes a sending module 73, configured to send first maximum transmit power to the first UE, where the first maximum transmit power is maximum transmit power that is indicated by the base station and that can be used when the first UE sends data on the first resource or when second UE accesses the virtual cell.

Optionally, the receiving module 71 is further configured to receive an identity and signal quality that are of a virtual cell established by third UE and that are sent by the first UE, and the scheduling module 72 is further configured to schedule a second resource for the first UE based on the identity and the signal quality of the virtual cell established by the third UE, where the second resource is used by the first UE to send a first synchronization signal and a first broadcast message, the first synchronization signal includes an identity of the virtual cell, and the first broadcast message includes configuration information of the virtual cell.

A first resource pool in which the first resource is located and a second resource pool in which the second resource is located do no intersect in time domain and/or in frequency domain, and the third UE is UE that has established a virtual cell by using a third resource in the second resource pool.

Optionally, the sending module 73 is further configured to send a second broadcast message to the first UE, where the second broadcast message is used to broadcast time domain information and frequency domain information of the second resource pool in which the second resource is located, so that the first UE determines the second resource pool based on the time domain information and the frequency domain information, and determines the third UE that has established the virtual cell by using the third resource in the second resource pool.

Optionally, the first resource pool is an unlicensed spectrum resource, and the second resource pool is a licensed spectrum resource.

Optionally, the second maximum transmit power is maximum transmit power that is indicated by the base station and that can be used when the first UE sends data on the second resource.

The present invention provides a base station. The base station may be configured to perform method steps corresponding to the base station in the embodiment shown in FIG. 3. Implementation principles and technical effects thereof are similar, and details are not described herein again.

Figure 8:
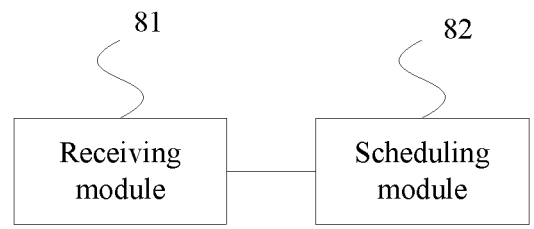
FIG. 8 is a schematic structural diagram of a base station according to another embodiment of the present invention.

FIG. 8 is a schematic structural diagram of a base station according to another embodiment of the present invention. As shown in FIG. 8, the base station includes a receiving module 81, configured to receive a virtual cell establishment request message sent by first user equipment UE, and a scheduling module 82, configured to schedule a first resource and a fifth resource of the first UE based on the virtual cell establishment request message, where the fourth resource is to establish a random access channel of a virtual cell, and the fifth resource is used to establish a data channel and a control channel of the virtual cell, and generate a reference signal corresponding to the data channel and a reference signal corresponding to the control channel, so that the first UE establish the random access channel of the virtual cell by using the fourth resource, and by using the fifth resource, establishes the data channel and the control channel, and generates the reference signal corresponding to the data channel and the reference signal corresponding to the control channel.

The present invention provides a base station. The base station may be configured to perform method steps corresponding to the base station in the embodiment shown in FIG. 5. Implementation principles and technical effects thereof are similar, and details are not described herein again.

Figure 9:
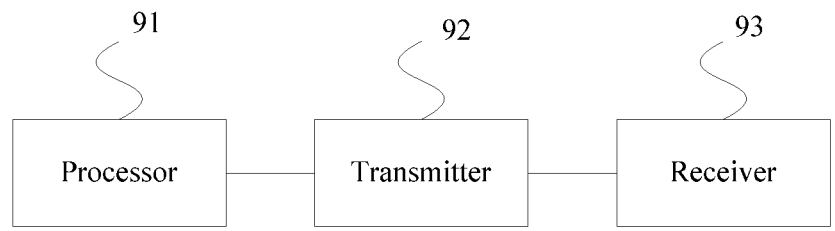
FIG. 9 is a schematic structural diagram of user equipment according to another embodiment of the present invention.

FIG. 9 is a schematic structural diagram of user equipment according to another embodiment of the present invention. The user equipment is the foregoing first UE. The user equipment includes a processor 91, configured to establish a virtual cell, and a transmitter 92, configured to send a first synchronization signal and a first broadcast message, where the first synchronization signal includes an identity of the virtual cell, and the first broadcast message includes configuration information of the virtual cell, so that based on the identity of the virtual cell and the configuration information of the virtual cell, second user equipment UE accesses the virtual cell and communicates with the user equipment.

The present invention provides user equipment. The user equipment may be configured to perform method steps corresponding to the first UE in the embodiment shown in FIG. 2. Implementation principles and technical effects thereof are similar, and details are not described herein again.

Optionally, the transmitter 92 is further configured to send a virtual cell establishment request message to a base station, where the virtual cell establishment request message is used to trigger the base station to schedule a first resource, and the first resource is used by the user equipment to establish a random access channel, a data channel, and a control channel of the virtual cell, and generate a reference signal corresponding to the data channel and a reference signal corresponding to the control channel, and optionally, the processor 91 is specifically configured to obtain the first resource, and by using the first resource, establish the random access channel, the data channel, and the control channel of the virtual cell, and generate the reference signal corresponding to the data channel and the reference signal corresponding to the control channel.

Optionally, the user equipment further includes a receiver 93, configured to receive first maximum transmit power sent by the base station, where the first maximum transmit power is maximum transmit power that is indicated by the base station and that can be used when the user equipment sends data on the first resource or when the second UE accesses the virtual cell.

Optionally, the processor 91 is further configured to obtain an identity and signal quality of a virtual cell established by third UE, and the transmitter 92 is further configured to send the identity and the signal quality of the virtual cell established by the third UE to the base station, so that the base station schedules a second resource for the user equipment based on the identity and the signal quality of the virtual cell established by the third UE, where the second resource is used by the user equipment to send the first synchronization signal and the first broadcast message.

A first resource pool in which the first resource is located and a second resource pool in which the second resource is located do no intersect in time domain and/or in frequency domain, and the third UE is UE that has established a virtual cell by using a third resource in the second resource pool.

Optionally, the receiver 93 is further configured to receive a second broadcast message sent by the base station, where the second broadcast message is used to broadcast time domain information and frequency domain information of the second resource pool, and the processor 91 is further configured to determine the second resource pool based on the time domain information and the frequency domain information, and determine the third UE.

Optionally, the receiver 93 is further configured to receive a second synchronization signal sent by the third UE, and the processor 91 is specifically configured to determine, based on the second synchronization signal, the identity and the signal quality of the virtual cell established by the third UE.

Optionally, the first resource pool is an unlicensed spectrum resource, and the second resource pool is a licensed spectrum resource.

Optionally, the receiver 93 is further configured to receive second maximum transmit power sent by the base station, where the second maximum transmit power is maximum transmit power that is indicated by the base station and that can be used when the first UE sends data on the second resource.

The present invention provides user equipment. The user equipment may be configured to perform method steps corresponding to the first UE in the embodiment shown in FIG. 3. Implementation principles and technical effects thereof are similar, and details are not described herein again.

Optionally, the transmitter 92 is further configured to send a virtual cell establishment request message to a base station, where the virtual cell establishment request message is used to trigger the base station to schedule a fourth resource and a fifth resource of the user equipment, the fourth resource is used to establish a random access channel of the virtual cell, and the fifth resource is used to establish a data channel and a control channel of the virtual cell, and generate a reference signal corresponding to the data channel and a reference signal corresponding to the control channel, and the processor 91 is specifically configured to obtain the fourth resource and the fifth resource, establish the random access channel of the virtual cell by using the fourth resource, and by using the fifth resource, establish the data channel and the control channel, and generate the reference signal corresponding to the data channel and the reference signal corresponding to the control channel.

The present invention provides user equipment. The user equipment may be configured to perform method steps corresponding to the first UE in the embodiment shown in FIG. 5. Implementation principles and technical effects thereof are similar, and details are not described herein again.

Figure 10:
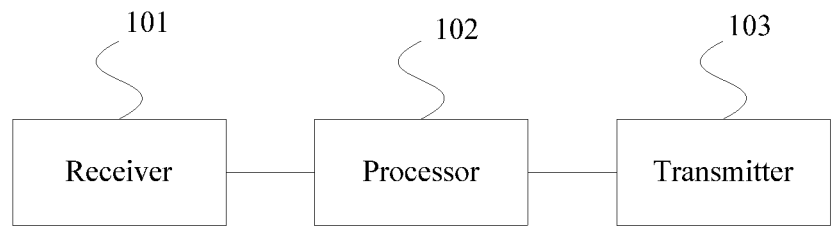
FIG. 10 is a schematic structural diagram of a base station according to still another embodiment of the present invention.

FIG. 10 is a schematic structural diagram of a base station according to still another embodiment of the present invention. As shown in FIG. 10, the base station includes a receiver 101, configured to receive a virtual cell establishment request message sent by first user equipment UE, and a processor 102, configured to schedule a first resource based on the virtual cell establishment request message, where the first resource is used by the first UE to establish a random access channel, a data channel, and a control channel of a virtual cell, and used by the first UE to generate a reference signal corresponding to the data channel and a reference signal corresponding to the control channel, so that by using the first resource, the first UE establishes the random access channel, the data channel, and the control channel of the virtual cell, and generates the reference signal corresponding to the data channel and the reference signal corresponding to the control channel.

The present invention provides a base station. The base station may be configured to perform method steps corresponding to the base station in the embodiment shown in FIG. 2. Implementation principles and technical effects thereof are similar, and details are not described herein again.

Optionally, the base station further includes a transmitter 103, configured to send first maximum transmit power to the first UE, where the first maximum transmit power is maximum transmit power that is indicated by the base station and that can be used when the first UE sends data on the first resource or when second UE accesses the virtual cell.

Optionally, the receiver 101 is further configured to receive an identity and signal quality that are of a virtual cell established by third UE and that are sent by the first UE, and the processor 102 is further configured to schedule a second resource for the first UE based on the identity and the signal quality of the virtual cell established by the third UE, where the second resource is used by the first UE to send a first synchronization signal and a first broadcast message, the first synchronization signal includes an identity of the virtual cell, and the first broadcast message includes configuration information of the virtual cell.

A first resource pool in which the first resource is located and a second resource pool in which the second resource is located do no intersect in time domain and/or in frequency domain, and the third UE is UE that has established a virtual cell by using a third resource in the second resource pool.

Optionally, the transmitter 103 is further configured to send a second broadcast message to the first UE, where the second broadcast message is used to broadcast time domain information and frequency domain information of the second resource pool in which the second resource is located, so that the first UE determines the second resource pool based on the time domain information and the frequency domain information, and determines the third UE that has established the virtual cell by using the third resource in the second resource pool.

Optionally, the first resource pool is an unlicensed spectrum resource, and the second resource pool is a licensed spectrum resource.

Optionally, the second maximum transmit power is maximum transmit power that is indicated by the base station and that can be used when the first UE sends data on the second resource.

The present invention provides a base station. The base station may be configured to perform method steps corresponding to the base station in the embodiment shown in FIG. 3. Implementation principles and technical effects thereof are similar, and details are not described herein again.

Figure 11:
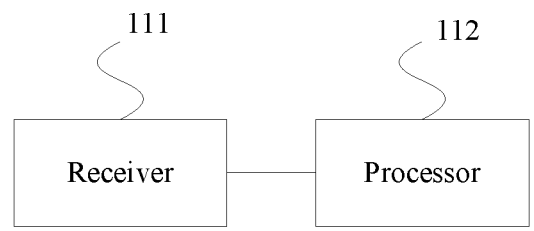
FIG. 11 is a schematic structural diagram of a base station according to yet another embodiment of the present invention.

FIG. 11 is a schematic structural diagram of a base station according to yet another embodiment of the present invention. As shown in FIG. 1i, the base station includes a receiver 111, configured to receive a virtual cell establishment request message sent by first user equipment UE, and a processor 112, configured to schedule a fourth resource and a fifth resource of the first UE based on the virtual cell establishment request message, where the fourth resource is used to establish a random access channel of a virtual cell, and the fifth resource is used to establish a data channel and a control channel of the virtual cell, and generate a reference signal corresponding to the data channel and a reference signal corresponding to the control channel, so that the first UE establishes the random access channel of the virtual cell by using the fourth resource, and by using the fifth resource, establishes the data channel and the control channel, and generates the reference signal corresponding to the data channel and the reference signal corresponding to the control channel.

The present invention provides a base station. The base station may be configured to perform method steps corresponding to the base station in the embodiment shown in FIG. 5. Implementation principles and technical effects thereof are similar, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A method, comprising:
    establishing, by a first user equipment (UE), a first virtual cell; and
    sending, by the first UE, a first synchronization signal and a first broadcast message, wherein the first synchronization signal comprises an identity of the first virtual cell, and wherein the first broadcast message comprises configuration information of the first virtual cell, wherein the first synchronization signal and the first broadcast message cause a second UE to access the first virtual cell according to the identity of the first virtual cell and the configuration information of the first virtual cell, and to communicate with the first UE, and wherein the first UE sends the first synchronization signal and the first broadcast message on a second resource scheduled by a base station according to an identity and a signal quality of a second virtual cell established by a third UE.

2. The method according to claim 1, wherein the establishing the first virtual cell comprises:
    sending, by the first UE, a virtual cell establishment request message to a base station, wherein the virtual cell establishment request message triggers the base station to schedule a first resource;
    obtaining, by the first UE, the first resource;
    establishing, by the first UE, using the first resource, a random access channel, a data channel, and a control channel of the first virtual cell; and
    generating a reference signal corresponding to the data channel and further generating a reference signal corresponding to the control channel.

3. The method according to claim 2, further comprising:
    receiving, by the first UE, a first maximum transmit power sent by the base station, wherein the first maximum transmit power is a maximum transmit power that is indicated by the base station and that can be used when the first UE sends data on the first resource or when the second UE accesses the first virtual cell.

4. The method according to claim 1, wherein the method further comprises performing, before the sending the first synchronization signal and the first broadcast message:
    obtaining, by the first UE, the identity and signal quality of the second virtual cell established by the third UE; and
    sending, by the first UE, the identity and the signal quality of the second virtual cell established by the third UE to the base station, so that the base station schedules the second resource for the first UE according to the identity and the signal quality of the second virtual cell established by the third UE;
    wherein the third UE is a UE that has established a third virtual cell by using a third resource in a second resource pool.

5. The method according to claim 4, wherein the method further comprises performing, before the obtaining the identity and the signal quality of the virtual cell established by third UE:
    receiving, by the first UE, a second broadcast message sent by the base station, wherein the base station broadcasts time domain information and frequency domain information of the second resource pool using the second broadcast message;
    determining, by the first UE, the second resource pool according to the time domain information and the frequency domain information; and
    determining the third UE.

6. The method according to claim 4, wherein the obtaining the identity and the signal quality of the second virtual cell established by third UE comprises:
    receiving, by the first UE, a second synchronization signal sent by the third UE; and
    determining, by the first UE according to the second synchronization signal, the identity and the signal quality of the second virtual cell established by the third UE.

7. The method according to claim 1, wherein the establishing the first virtual cell comprises:
    sending, by the first UE, a virtual cell establishment request message to a base station, wherein the virtual cell establishment request message triggers the base station to schedule a fourth resource and a fifth resource of the first UE, wherein the fourth resource is used to establish a random access channel of the virtual cell, and wherein the fifth resource is used to establish a data channel and a control channel of the virtual cell, and further to generate a reference signal corresponding to the data channel and a reference signal corresponding to the control channel;
    obtaining, by the first UE, the fourth resource and the fifth resource;
    establishing the random access channel of the virtual cell by using the fourth resource;
    establishing the data channel and the control channel using the fifth resource; and
    generating the reference signal corresponding to the data channel and the reference signal corresponding to the control channel.

8. A method, comprising:
    receiving, by a base station, a virtual cell establishment request message sent by a first user equipment (UE);
    scheduling, by the base station, a first resource according to the virtual cell establishment request message, wherein the scheduling the first resource causes the first UE to establish, using the first resource, a random access channel, a data channel, and a control channel of a first virtual cell, and further to generate, using the first resource, a reference signal corresponding to the data channel and a reference signal corresponding to the control channel; and
    receiving, by the base station, an identity and signal quality that are of a second virtual cell established by third UE and that are sent by the first UE; and
    scheduling, by the base station, a second resource for the first UE based on the identity and the signal quality of the second virtual cell established by the third UE, wherein the second resource is used by the first UE to send a first synchronization signal and a first broadcast message, wherein the first synchronization signal comprises an identity of the first virtual cell, and wherein the first broadcast message comprises configuration information of the first virtual cell.

9. The method according to claim 8, further comprising:
    sending, by the base station, a first maximum transmit power to the first UE, wherein the first maximum transmit power is a maximum transmit power that is indicated by the base station and that can be used when the first UE sends data on the first resource or when a second UE accesses the first virtual cell.

10. The method according to claim 8,
wherein a first resource pool in which the first resource is located and a second resource pool in which the second resource is located do not intersect in a time domain or in a frequency domain; and
wherein the third UE is a UE that has established a third virtual cell by using a third resource in the second resource pool.

11. The method according to claim 10, wherein the method further comprises performing, before the receiving, by the base station, an identity and signal quality that are of a virtual cell established by third UE and that are sent by the first UE:
sending, by the base station, a second broadcast message to the first UE, wherein base station broadcasts time domain information and frequency domain information of the second resource pool in which the second resource is located using the second broadcast message wherein the second broadcast message causes the first UE to determine the second resource pool according to the time domain information and the frequency domain information, and further to determine the third UE that has established the third virtual cell by using the third resource in the second resource pool.

12. The method according to claim 10, wherein the first resource pool is an unlicensed spectrum resource, and wherein the second resource pool is a licensed spectrum resource.

13. The method according to claim 10, further comprising sending, by the base station, a second maximum transmit power to the first UE, wherein the second maximum transmit power is a maximum transmit power that is indicated by the base station and that can be used when the first UE sends data on the second resource.

14. User equipment, comprising:
a transmitter;
a processor;
a non-transitory computer-readable storage medium storing a program to be executed by the processor, the program including instructions to:
establish a first virtual cell; and
cause the transmitter to send a first synchronization signal and a first broadcast message, wherein the first synchronization signal comprises an identity of the first virtual cell, and wherein the first broadcast message comprises configuration information of the first virtual cell, wherein the first synchronization signal and the first broadcast message cause a second user equipment UE to access, based on the identity of the first virtual cell and the configuration information of the first virtual cell, the first virtual cell and communicates with the user equipment, and wherein the first synchronization signal and the first broadcast message are sent on a second resource scheduled by a base station according to an identity and a signal quality of a second virtual cell established by a third UE.

15. The user equipment according to claim 14, wherein the program further includes instructions to:
cause the transmitter to send a virtual cell establishment request message to a base station, wherein the virtual cell establishment request message triggers the base station to schedule a first resource; and
obtain the first resource; and
establish, using the first resource, a random access channel, a data channel, and a control channel of the first virtual cell; and
generate, using the first resource, a reference signal corresponding to the data channel and a reference signal corresponding to the control channel.

16. The user equipment according to claim 15, wherein the first resource pool is an unlicensed spectrum resource, and the second resource pool is a licensed spectrum resource.

17. The user equipment according to claim 14, wherein the program further includes instructions to:
obtain the identity and signal quality of the second virtual cell established by third UE; and
cause the transmitter to send the identity and the signal quality of the second virtual cell established by the third UE to the base station, so that the base station schedules the second resource for the user equipment according to the identity and the signal quality of the second virtual cell established by the third UE; and
wherein the third UE is UE that has established a third virtual cell by using a third resource in a second resource pool.

18. The user equipment according to claim 17, further comprising a receiver;
wherein the program further includes instructions to:
receive, through the receiver, a second broadcast message sent by the base station, wherein the second broadcast message indicates broadcast time domain information and frequency domain information of the second resource pool; and
determine the second resource pool according to the time domain information and the frequency domain information, and determine the third UE.

19. The user equipment according to claim 17, further comprising a receiver;
wherein the program further includes instructions to:
receive, through the receiver, a second synchronization signal sent by the third UE; and
determine, according to the second synchronization signal, the identity and the signal quality of the second virtual cell established by the third UE.

20. The user equipment according to claim 14, wherein the program further includes instructions to:
cause the transmitter to send a virtual cell establishment request message to a base station, wherein the virtual cell establishment request message triggers the base station to schedule a fourth resource and a fifth resource of the user equipment, wherein the fourth resource is used to establish a random access channel of the first virtual cell, and wherein the fifth resource is used to establish a data channel and a control channel of the first virtual cell;
cause the transmitter to generate a reference signal corresponding to the data channel and a reference signal corresponding to the control channel;
obtain the fourth resource and the fifth resource
establish the random access channel of the first virtual cell by using the fourth resource;
establish the data channel and the control channel using the fifth resource; and
generate the reference signal corresponding to the data channel and the reference signal corresponding to the control channel.

* * * * *